UNITED STATES PATENT OFFICE.

HORACE WILLIAMS AND JOHN L. ALBERGER, OF BUFFALO, NEW YORK.

ART OF MANUFACTURING GLUCOSE AND GRAPE-SUGAR FROM CORN OR OTHER CEREALS.

SPECIFICATION forming part of Letters Patent No. 308,937, dated December 9, 1884.

Application filed February 24, 1883. (No specimens.)

*To all whom it may concern:*

Be it known that we, HORACE WILLIAMS and JOHN L. ALBERGER, citizens of the United States, both residing in Buffalo, in the county of Erie and State of New York, have invented certain new and useful Improvements in the Art of Manufacturing Glucose and Grape-Sugar from Corn or other Cereals and Roots, of which the following is a description in such full, clear, concise, and exact terms as will enable any one skilled in the art to which our invention belongs to make and use the same.

This invention relates to the manufacture of glucose and grape-sugar from corn or other grains and from roots. It includes a method of so manipulating the grain or roots as to abstract from them all the sugar-producing properties they contain. It also includes a method of defecating and purifying the solutions obtained by this process at various stages in their manufacture, our object being to produce a larger yield and a sweeter and better-flavored article than is now produced or known to commerce, and at the same time to reduce the cost of the operation of manufacturing such article.

Our method or process relates more particularly to the manufacture of sugar and sirup direct from grain or meal, (corn being preferred and generally used;) but portions of this process is applicable to glucose or sugar made from starch also.

The sugar and sirup made by our process herein described is specifically sweeter than ordinary glucose or sugar. It has a pronounced flavor, more like that of cane sugar or sirup, and it has none of the mawkish flavor or residual medicinal flavor of the glucose and grape-sugar of commerce. This we attribute to the different native substances contained in our product, and also to the improved method of defecating described herein, which, by destroying and eliminating impurities, improve the flavor, color, and sweetness of the article.

The large yield of forty-five (45) pounds to the bushel of corn is the result of our improved method of separating the saccharine-producing elements from the grain, leaving nothing as residuum but husk, fiber, gluten, albumen, and oil. These latter substances, when combined together, produce a highly-nutritious food for animals.

Our process is as follows: First we grind the grain into coarse meal, leaving the bran in. Then to every bushel of meal we take twelve (12) gallons of water, (or other liquid, as hereinafter described,) and from one-half (½) to one (1) pound of sulphuric acid of 1.66 gravity, (Baumé,) thoroughly mix the meal, acid, and water, and then put it in a suitable vessel provided with a perforated coil along its bottom to introduce steam, by which the mass is boiled. This vessel may be open under atmospheric pressure or a closed one, which latter we prefer, and operated under about twenty (20) pounds pressure to the square inch. During the boiling we allow portions of steam to escape, so as to insure a moderate agitation of the meal. As soon as the starch, native gum, and native sugar in the meal have become, by the acid, water, and heat acting on them, soluble in the acid and water, making a mass composed of sugar, gum, acid, water, husks, fibers, gluten, albumen, and oil, (which period of conversion should be about two (2) hours from the time of turning on the steam,) which may be determined by the readiness which a sample taken from the vessel will filter through a cloth, also by the usual iodine test, showing a conversion to gum, the steam is shut off, and by gravity or by a pump we proceed to separate the solid and insoluble parts of the converted meal by filtering it in any suitable filtering apparatus. The insoluble portions, together with some water, acid, and gum, remain in the filter, while most of the liquid portion, which is composed of acid, water, gum, some sugar, and some soluble impurities, escapes. If the meal conversion has been properly done, the gum solution will pass the filter rapidly, and is what we call our "first filtrate." Next we neutralize the sulphuric acid in the gum solution by chalk or whiting or marble-dust as far as they will go, when it will be found by litmus test that a notable portion of acid and a strong bitter flavor remain. We have discovered that this acid is the grain acid, and is a solvent of a portion of the gluten and albumen of the grain, which by it are made soluble in the gum solution; also, that the said acid is the cause of or contains the bitter grain flavor. We have also discovered that quick or air-slaked lime, either dry in powder or in a watery solution, neutralizes this acid and destroys the grain flavor and eliminates the gluten, albumen, and other impurities from the gum solution, making them insoluble and capable of separation by filtering, so that it may be converted into sugar or sirup in a pure state, going upon the charcoal filters with but little flavor, and but little impurity to clog or impair the action of the coal. We have also discovered that air-slaked or quick lime operates in like manner upon the sugar and sirup solutions after conversion, which we will describe hereinafter. Want of knowledge of this part of our process has heretofore prevented grain sugar and sirup reaching a fairly-marketable condition; besides, so much treatment by coal has been necessary and the coal so rapidly becoming clogged as to make the expense outweigh the profit. As before stated, the lime may be applied in a powder; but we prefer to make it into a cream of 6° Baumé strength, and gradually apply it to the gum solution in a hot condition, about 180° Fahrenheit, until the liquor will show a neutral test. Then we heat the gum to boiling-point, when, if a portion is observed in a glass test-tube, the coagulum is plainly visible. Next we filter out the lime and spent marble-dust, together with the coagulated impurities, when the gum will be found to have a mild sweetish taste, and to have lost the acid or bitter grain flavor. In conducting this defecation care should be taken to bring the mass to a boil, as the defecation and clarification are more positive at that heat.

A modification of our defecating process upon the gum solution is this: Instead of neutralizing the sulphuric acid present in it, after it has been heated to 180° Fahrenheit, carefully add the lime and test the liquor until the coagulum ensues. Then discontinue the lime and bring the liquor to a boil. There will be found to be a notable portion of the sulphuric acid intact, by which the advantages of the coagulation and defecation are secured. This liquor, after filtering, may be converted into sugar or sirup with from one-fourth to one-half less acid than by the former method. Another modification is: After the neutralization of the acid is effected and the lime has been added and the liquor boiled, the lime may be in excess, and then sulphurous-acid gas is introduced, which will neutralize the excess of lime, and at the same time bleach or whiten the solution. Now, after the treatment of the filtrate, it is run into the converter with three-fourth pounds of acid to the bushel of corn used in the first instance, if in the gum treatment all the sulphuric acid has been neutralized; but if not, one-half pound of acid to the bushel will suffice, and boil by the direct action of steam blown into it. The converter may be of wood or copper, and may be opened or closed. We prefer the latter, and use upon it about twenty (20) pounds steam to the square inch for about one (1) hour, when the conversion into sugar or sirup will take place, which may be tested by the usual iodine or alcohol tests. Next the converted liquor is neutralized by carbonate of lime, and a small portion of cream of lime is added until the liquor is neutral. Next we run the liquor over the bone-black, and then concentrate it in a vacuum-pan to 30° Baumé, and if at this stage the acid or grain flavor reappears we again treat it with cream of lime to make it entirely neutral or even slightly alkaline, and then filter it. Then we introduce sulphurous-acid gas, which neutralizes the excess of lime and whitens the goods. The same effect will be produced by first sulphuring and afterward applying the lime. We again pass the 30° liquor over the bone-black, and finally concentrate it to the proper consistency for sirup or sugar, filter and barrel it.

It will be understood that what we have called the "first filtrate" is the only solution upon which we operate to produce sugar or sirup, the second and third filtrates, which we shall presently describe, being only used as vehicles to bring back from the residuum valuable solutions containing gum, sugar, water, and acid, and by their aid to extract from the residuum all its saccharine properties, and also increase the gravity of the first filtrate to a proper working degree.

After having filtered the meal containing husks, gluten, albumen, and oil, which we shall hereinafter call the "residuum," to produce the first filtrate we take the residuum, which is saturated with the acid, water, gum, &c., and to it add for every bushel of corn used twelve (12) gallons of water or other liquor, as hereinafter stated, mix and stir and heat it and again filter it. The liquid filtrate which escapes, composed of acid, water, and gum, we call our "second filtrate." Again, we take the residuum from the filter still saturated with acid, gum, and water, and to it add for every bushel of corn used twelve (12) gallons of water, mix and stir it, heat it, and again filter it. The liquid filtrate which escapes, composed of acid, water, and gum, we call our "third filtrate." From the filter we again take the residuum, and if needed for animal food we wash it with water and add sufficient cream of lime to make it test neutral; but if wanted in solid form this neutralization can be done on the third filtrate. This feed will be found very valuable and nutritious, as it contains no deleterious properties, but is composed of oil, husk, albumen, gluten, &c., all highly valuable animal food substances. Now, in making our second boil of meal, instead of using water to mix with, we use our second filtrate of the former lot, which weighs about 5½° Baumé and measures twelve (12) gallons to the bushel of meal to be used, and add from one-half to one pound of acid to the bushel. The smaller amount will suffice in this instance, owing to the acid in the "second filtrate,"

The time, tests, &c., will be the same as described in the first meal conversion. Upon filtering this lot the first filtrate will be found to be of greater specific gravity than the former lot, owing to the addition of gravity in the second filtrate, and should weigh 170° Baumé. It is operated upon to produce saccharine in like manner as before. The residuum of the first filtration is now mixed with the water, acid, and gum of the "third filtrate" of the former lot, stirred, heated, and filtered, and produces the second filtrate of this lot, and weighs about 6° Baumé, and is used in mixing the next lot of meal for conversion. The residuum of the second filtrate is now mixed with twelve (12) gallons of water to the bushel of meal used, stirred and heated and filtered, and produces the third filtrate of this lot, and weighs about 1½° Baumé. In making the next boil of meal we proceed in like manner, and so continue to operate. In case a greater gravity should be required in the first filtrate, it may be obtained by using less water—say ten gallons to the bushel—and making the "fourth filtrate," putting back and accumulating as before.

The advantage of our washing and refiltering process is apparent, since we obtain a high gravity in the "first filtrate," and a very low gravity of solution in our final residuum—results which cannot be obtained in any other way, for if we were to use thirty-six (36) gallons of water in mixing a bushel of meal the filtrate would be at least forty (40) gallons, and would be about 4° Baumé gravity, while even with so much attenuation the residuum, being (when well pressed) sixty (60) per cent. fluid matter, would be of the same gravity. The practical effect of our rewashing, filtering, and adding back is equal to the cost of evaporating one-half (½) of our liquor, and we increase our gravity without evaporating—a result of great value and importance.

We wish to state here that in the use of our rewashing process a clean filtrate, and one made under pressure, is preferable in each instance, and particularly the final one, in order to abstract all the solution that is practicable.

Sparging as practiced by brewers is not like our washing and refiltering process, as they use the whole wash and do not save and accumulate strength, and put back by successive steps as we do, yet keeping the first filtrate at maximum strength and discharging the residuum divested of solution of any value. Our rewashing and filtering process would be also of great advantage where, as is sometimes done, sufficient acid is put upon the meal to produce saccharification of the starch, gum, &c., in the first instance. Then the acid is neutralized upon the meal mass or mash, then filtered, and to follow out our method rewash and carry back the weaker second and third filtrates to boil the meal in and to rewash with. This would obviate the difficulty usually experienced by this method of being obliged to use so much water as to make a liquor of low gravity, and also lose considerable valuable solution in the waste. If the concentrated liquor of this method is treated, our methods of neutralizing by lime will be our great advantage, whether the subsequent process by sulphur, gas, and heat is employed or not. Our method of operating this modification would be after conversion to leave the acids in the filtrates until the meal is completely rewashed, as before stated, in treating our gum solution. We then keep the neutralizing medium out of the feed and save the acid in the second and third filtrates, and finally treat in our usual way; but we prefer to separate our meal and residuum from the gum solution, as before stated, because by discontinuing the conversion at that stage we keep the residuum from long action by the heat and sulphuric acid, which changes the color of the residuum and solution, enabling us to defecate and purify before final conversion, thus making a better-colored and purer-flavored product. Again, by separating the gum solution we by our rewashings carry back only gum, or at most a very small portion of sugar in the solution, and after repeated and long-continued boilings, rewashings, and carrying back, as described, our color and flavor are not impaired. Treatment by sulphur and lime on the gum solution is also important, as they purify the solution for the converter. Any such purifying results in better goods at less cost. Bone-black may also be employed upon the gum if neutralized and defecated, with like good effect as to color and flavor as when used on sugar solutions, and in the usual manner as when used for sugar.

Having described our invention, we claim and desire to secure by Letters Patent—

1. In the manufacture of glucose and grape-sugar direct from grain or meal, the method, substantially herein described, of neutralizing the converting and organic acids, which method consists of treating the same with quick or air-slaked lime.

2. In the manufacture of glucose and grape-sugar or sirup from grain or meal, the method, substantially herein described, of defecating the sugar or sugar solution, which method consists of treating it with quick or air-slaked lime, substantially as described.

3. In the manufacture of glucose and grape-sugar from grain or meal or sirup, the method, substantially herein described, of defecating the gum solution before its conversion into sugar, which method consists of treating said solution with quick or air slaked lime, substantially as described.

4. In the manufacture of glucose and grape-sugar from grain or meal, the method, substantially herein described, of defecating the gum solution before conversion and the sugar solution after conversion, which method consists of treating said solutions with lime and sulphurous acid gas, substantially as described.

5. In the manufacture of glucose and grape sugar from grain or meal, the process, substantially herein described, of obtaining a high gravity in the working solution and a low gravity in the residuum, which method consists in treating the material by the following steps in succession, viz: first, separating the meal from the soluble dextrine, acid, and water; second, mixing the residuum with water or a filtrate from a preceding operation and separating it by filtration; third, mixing the residuum made in the second step with water and again separating it by filtration, substantially as described.

6. In the manufacture of glucose and grape-sugar from grain or meal, the method, substantially herein described, of treating the meal for conversion, which method consists of mixing said meal with a solution of acid, dextrine, and water obtained by rewashing and filtering the residuum of a previous operation, substantially as described.

7. In the manufacture of glucose and grape-sugar from grain or meal, the process, substantially herein described, of obtaining a high gravity in the working sugar solution and a low gravity in the residuum, which method consists of the following steps in succession, viz: first, separating the meal from the sugar solution; second, mixing the residuum with water or a filtrate from a preceding operation and separating it by filtration; third, mixing the residuum made in the second step with water and again filtering it, substantially as described.

8. In the manufacture of glucose and grape-sugar from grain or meal, the method, substantially herein described, of treating the meal and acid in the operation of conversion, which method consists in mixing the meal and acid with a solution of sugar, acid, and water obtained from a preceding operation in rewashing and filtering, substantially as described.

9. In the manufacture of glucose and grape-sugar from grain or meal, the method of treating the meal and acid used in the conversion, which method consists in mixing the acid and meal for conversion with a solution of acid, gum, and water.

10. In the manufacture of glucose and grape-sugar from grain or meal, the method, substantially herein described, of defecating the gum, acid, and water solution, which method consists in treating the said solution with lime and heat, substantially as described.

11. In the manufacture of amylaceous sugar, the method of defecating the sugar solution, consisting of treating said solution with the action of lime and heat, substantially as described.

12. In the manufacture of glucose and grape-sugar from grain or meal, the process, substantially herein described, of treating the gum solution, which process consists of first defecating the solution, as described, and of then treating it with bone-black, the same as in the case of sugar.

HORACE WILLIAMS.
JOHN L. ALBERGER.

Witnesses:
AMOS BROADNAX,
J. EDGAR BULL.